(12) United States Patent
Yao

(10) Patent No.: US 9,191,653 B2
(45) Date of Patent: Nov. 17, 2015

(54) SWITCH CELL AND MANUFACTURING METHOD THEREOF, DISPLAY PANEL, AND DISPLAY DEVICE

(71) Applicant: Boe Technology Group Co. Ltd., Beijing (CN)

(72) Inventor: Xing Yao, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 42 days.

(21) Appl. No.: 14/084,199

(22) Filed: Nov. 19, 2013

(65) Prior Publication Data

US 2014/0139765 A1    May 22, 2014

(30) Foreign Application Priority Data

Nov. 21, 2012 (CN) .......................... 2012 1 0475857

(51) Int. Cl.
*G02F 1/1343*     (2006.01)
*H04N 13/04*      (2006.01)
*G02B 27/22*      (2006.01)

(52) U.S. Cl.
CPC ....... *H04N 13/0411* (2013.01); *H04N 13/0452* (2013.01); *G02B 27/22* (2013.01); *G02B 27/2214* (2013.01); *H04N 2213/001* (2013.01); *Y10T 29/49105* (2015.01)

(58) Field of Classification Search
CPC ............... G02F 1/134309; H04N 13/0452; G02B 27/22
USPC ............................... 349/15; 29/622
See application file for complete search history.

(56) References Cited

U.S. PATENT DOCUMENTS

| | | | |
|---|---|---|---|
| 2004/0263721 A1* | 12/2004 | Chen et al. ..................... | 349/106 |
| 2006/0209371 A1* | 9/2006  | Hamagishi ...................... | 359/15 |
| 2009/0015739 A1* | 1/2009  | Shin et al. ...................... | 349/15 |
| 2011/0157697 A1* | 6/2011  | Bennett et al. ................. | 359/462 |
| 2012/0075434 A1  | 3/2012  | Kim et al. | |
| 2013/0083264 A1* | 4/2013  | Hagiwara et al. .............. | 349/42 |
| 2013/0147730 A1* | 6/2013  | Chien et al. ................... | 345/173 |
| 2013/0176511 A1* | 7/2013  | Hoshino et al. ............... | 349/15 |
| 2014/0022219 A1* | 1/2014  | Kim et al. ...................... | 345/204 |
| 2014/0022470 A1* | 1/2014  | Yang et al. ..................... | 349/15 |

FOREIGN PATENT DOCUMENTS

| | | | | |
|---|---|---|---|---|
| CN | 101339345 A | 1/2009 | | |
| CN | 101424808 A | 5/2009 | | |
| CN | 102141714   | * 8/2011 | ............. | G02F 27/22 |

(Continued)

OTHER PUBLICATIONS

Chinese Office Action (in Chinese and translated in English) in corresponding Chinese Application No. CN201210475857.X, dated Aug. 28, 2014.

*Primary Examiner* — Sang V Nguyen
(74) *Attorney, Agent, or Firm* — Kinney & Lange, P.A.

(57) ABSTRACT

Embodiments of the present invention provide a switch cell and manufacturing method thereof, a display substrate, and a display device and the manufacturing method thereof, the driving power required by the switch cell can be reduced. The switch cell for converting a 2D image to be displayed by a display substrate into a 3D image comprises: a switch substrate; and at least one metal electrode provided on the switch substrate, wherein the position of the metal electrode is configured to be correspond to at least a portion of one corresponding black matrix of at least one black matrix provided on a display substrate.

19 Claims, 4 Drawing Sheets

(56) References Cited

FOREIGN PATENT DOCUMENTS

| | | |
|---|---|---|
| CN | 102141714 A | 8/2011 |
| CN | 102402096 A | 4/2012 |
| CN | 102540527 A | 7/2012 |
| JP | 2009204938 A | 9/2009 |
| JP | 2003029001 A | 1/2013 |

* cited by examiner

SWITCH CELL AND MANUFACTURING METHOD THEREOF, DISPLAY PANEL, AND DISPLAY DEVICE

CROSS-REFERENCE TO RELATED APPLICATION

This application claims the benefit of Chinese Patent Application No. 201210475857.X filed on Nov. 21, 2012 in the State Intellectual Property Office of China, the whole disclosure of which is incorporated herein by reference.

BACKGROUND OF THE INVENTION

1. Field of the Invention

Embodiments of the present invention relate to the technical field of display, and especially to a switch cell for converting a two dimensional (2D) image into a three dimensional (3D) image and manufacturing method thereof, a display panel, and a display device.

2. Description of the Related Art

Liquid crystal 3D display substrate technology is used to realize 3D display by providing a switch cell on a conventional 2D image display substrate. For the structure of the liquid crystal 3D display substrate, electrodes in the switch cell is constructed by transparent materials, such as Indium Tin Oxide (ITO), in order to avoid shielding pixels. However, the resistivity of the electrodes made from the transparent ITO is very high, such that the impedance of the entire display panel is very high, and the driving power required by the display panel is increased. This defect is especially serious when producing large sized display panel.

SUMMARY OF THE INVENTION

The present invention has been made to overcome or alleviate at least one aspect of the above mentioned disadvantages. Accordingly, it is an object of the present invention to provide a switch cell and manufacturing method thereof, a display panel, and a display device to decrease the driving power being required.

According to one embodiment of the present invention, there is provided a switch cell for converting a 2D image to be displayed by a display substrate into a 3D image, the switch cell comprises: a switch substrate; and at least one metal electrode provided on the switch substrate. The position of the metal electrode corresponds to at least a portion of one corresponding black matrix of at least one black matrix provided on the display substrate.

According to a further embodiment of the present invention, there is provided a display panel comprising the switch cell described in the preceding embodiment and a display substrate provided with a plurality of black matrixes.

According to a still further embodiment of the present invention, there is provided a display device, comprising the display panel described in the preceding embodiment.

According to an even further embodiment of the present invention, there is provided a method of manufacturing a switch cell for converting a 2D image into a 3D image, the image transmitted from the switch cell is displayed on a display substrate, the method comprises:

forming at least one metal electrode on a switch substrate, the position of the metal electrode is configured to correspond to at least a portion of one corresponding black matrix of at least one black matrix provided on the display substrate.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
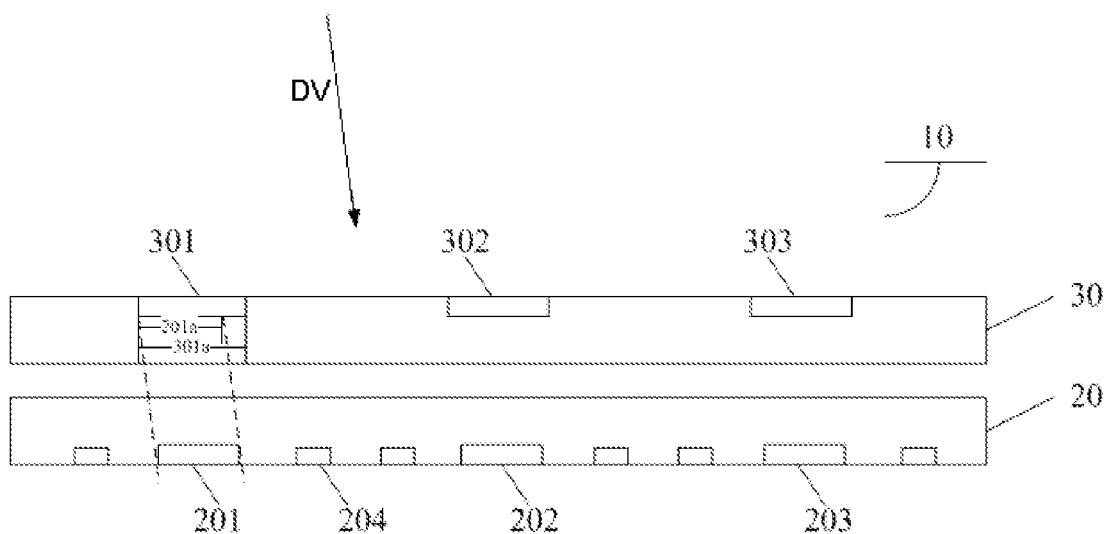
FIG. 1 is a section view of a display panel comprising a switch cell according to the first embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

A switch cell and manufacturing method thereof, a display panel, and a display device provided in the embodiments of the present invention will be described in detail with reference to the drawings.

The first exemplary embodiment of the invention provides a switch cell 20 for converting a 2D image to be displayed by a display substrate into a 3D image. For better explaining the switch cell 20, the display substrate 30 for displaying images from the switch cell is also shown in FIG. 1.

Generally, the display substrate 30 is used to display images from the switch cell, and the switch cell 20 is constructed to convert a 2D image into a 3D image when powered and maintain the 2D image format when not powered, such that the format of the image to be transmitted to the display substrate 30 can be controlled by the switch cell 20. In one exemplary embodiment, the switch cell 20 comprises a switch substrate 220 and at least one metal electrode 201 provided on the switch substrate 220. The position of each metal electrode 201 is configured to correspond to at least a part of a region occupied by one corresponding black matrix 301 of at least one black matrix on the display substrate 30, such that the metal electrode 201 is shielded by the corresponding black matrix 301 at a certain extent.

In one embodiment, a plurality of metal electrodes 201 may be provided on the switch substrate 220. For example, each position on the switch cell 20 which corresponds to one black matrix is provided with a metal electrode. As shown in FIGS. 1 and 2, for example, black matrixes 301, 302, and 303 are provided in the display substrate 30, and each corresponding position on the switch cell 20 to the black matrix 301, 302 or 303 is provided with a metal electrode 201, 202, or 203. Dotted lines connecting the black matrix and the metal electrode in FIG. 2 show the corresponding relationship between the black matrix 301 and the metal electrode 201.

Figure 2:
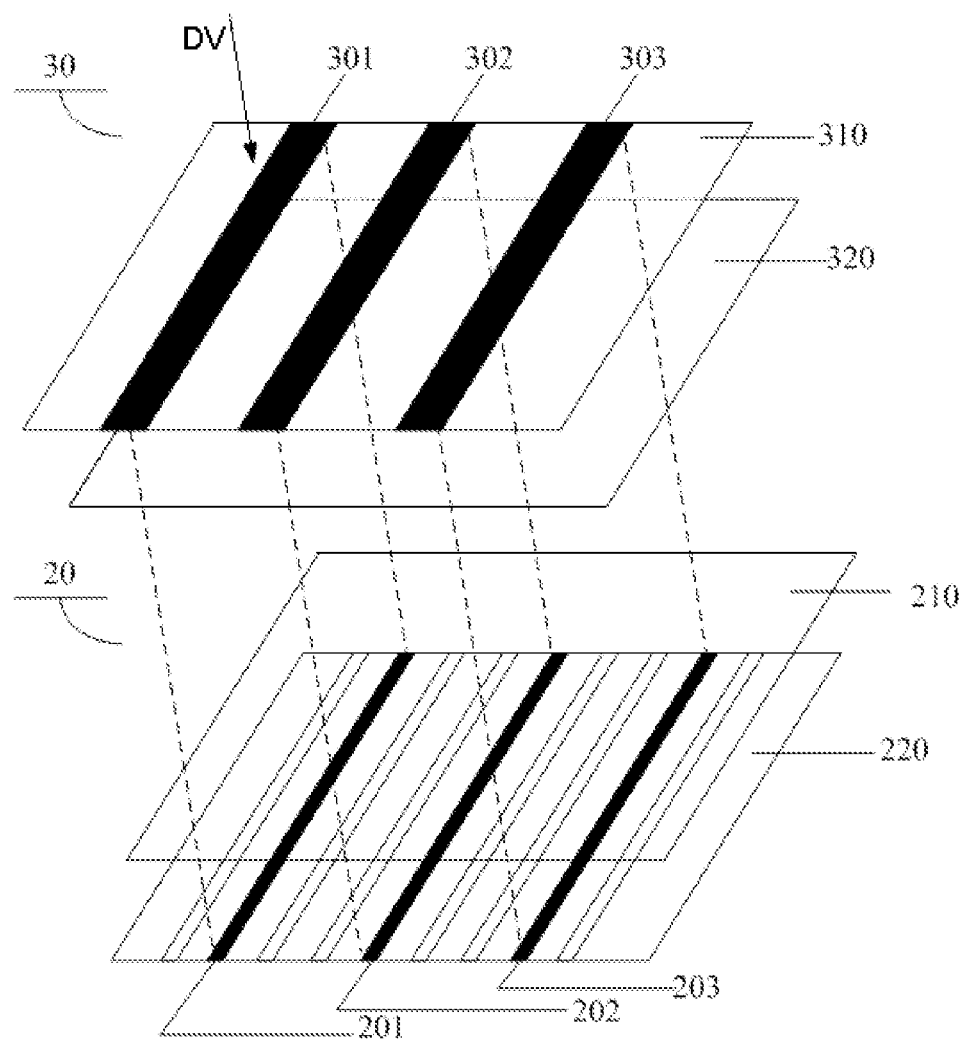
FIG. 2 is an exploded view of the display panel of FIG. 1.

Further, in a further exemplary embodiment of the invention, as shown in FIG. 1, transparent electrodes ITO 204 may be positioned at other positions on the switch cell 20. The resistances of the metal electrodes are remarkably smaller than those of the transparent electrodes ITO, for example, the resistances of the metal electrodes are $1/600$ of those of the transparent electrodes ITO. The transparent electrodes ITO and the metal electrodes 201 are electrically connected in parallel, and their total resistance mainly depends on the resistance of the metal electrodes 201, such that the total resistance is reduced significantly. An embodiment of the switch cell 20 comprising the transparent electrodes ITO is disclosed, but the invention is not limited thereto, a switch cell 20 without transparent electrodes ITO may also be appreciated by those skilled in the art.

In the switch cell 20 according to the embodiment of the invention, at least one metal electrode 201 is shielded by the black matrix 301 at a certain extent by positioning each metal electrode 201 in alignment with at least a portion of the region occupied by the black matrix 301 in a direction of view, such that total resistance of the switch cell is significantly reduced without affecting the aperture ratio of the display panel. Further, driving power required by the display panel is decreased, such that the switch cell is especially suitable for large sized display panel.

In a further embodiment of the invention, as shown in FIG. 1, the position of the metal electrode 201 is configured to correspond to at least a portion of the region occupied by the black matrix 301. Specifically, in the direction of view (DV), the projection of the metal electrode 201 on the display substrate 30 does not fall outside the region occupied by the black matrix 301. The direction of view is orientated to have an angle of 80-90 degree with respect to the plane of the display substrate 30.

FIG. 1 illustrates an arrow DV indicating the direction of viewing the display substrate 30. As shown by the arrow DV, the projection of the metal electrode 201 on the display substrate 30 does not fall outside the region occupied by the black matrix 301. When a plurality of metal electrodes is provided, as shown in FIG. 1, the projection of each one of the metal electrodes 201, 202, 203 onto the display substrate 30 in the direction of the view does not fall outside the region occupied by corresponding one of the black matrixes 301, 302, and 303.

Besides, the angle between the direction of view and the plane of the display substrate 30 is set within a range of 80-90 degrees, such as 85 degrees, 95 degrees, etc. It can be appreciated that the size and number of the metal electrodes in the switch cell tend to increase to the maximum as the direction of view is approaching the line perpendicular to the plane of the display substrate 30.

In the switch cell according to the embodiment of the invention, when the projection of the metal electrode in the direction of the view onto the display substrate does not go beyond the region occupied by the black matrix, the metal electrode is ensured to be totally shielded by the black matrix, and the effect of watching is ensured. When the angle between the direction of view and the plane of the display substrate is set within the range of 80-90 degrees, a suitable angle of view can be arrived and the size and number of the metal electrodes in the switch cell can be ensured, such that total resistance of the switch cell can be further reduced, the driving power required by the display panel is decreased, and the switch cell is especially suitable for large sized display panel.

In a further exemplary embodiment of the invention, the position of the metal electrode is configured to align with at least a portion of the region occupied by the black matrix in the direction of view. Specifically, the orthogonal projection region of the metal electrode 201 on the display substrate 30 is overlapped with the region 301*a* occupied by the black matrix 301 on the display substrate 30, such that the size of the metal electrode may be maximized to reduce total resistance of the switch cell as much as possible, therefore the driving power required by the display panel is decreased, and the switch cell is especially suitable for large sized display panel.

In an exemplary embodiment of the invention, as shown in FIG. 2, the switch cell 20 also comprises a common electrode substrate 210 positioned between the display substrate 30 and the switch substrate 220.

Figure 3:
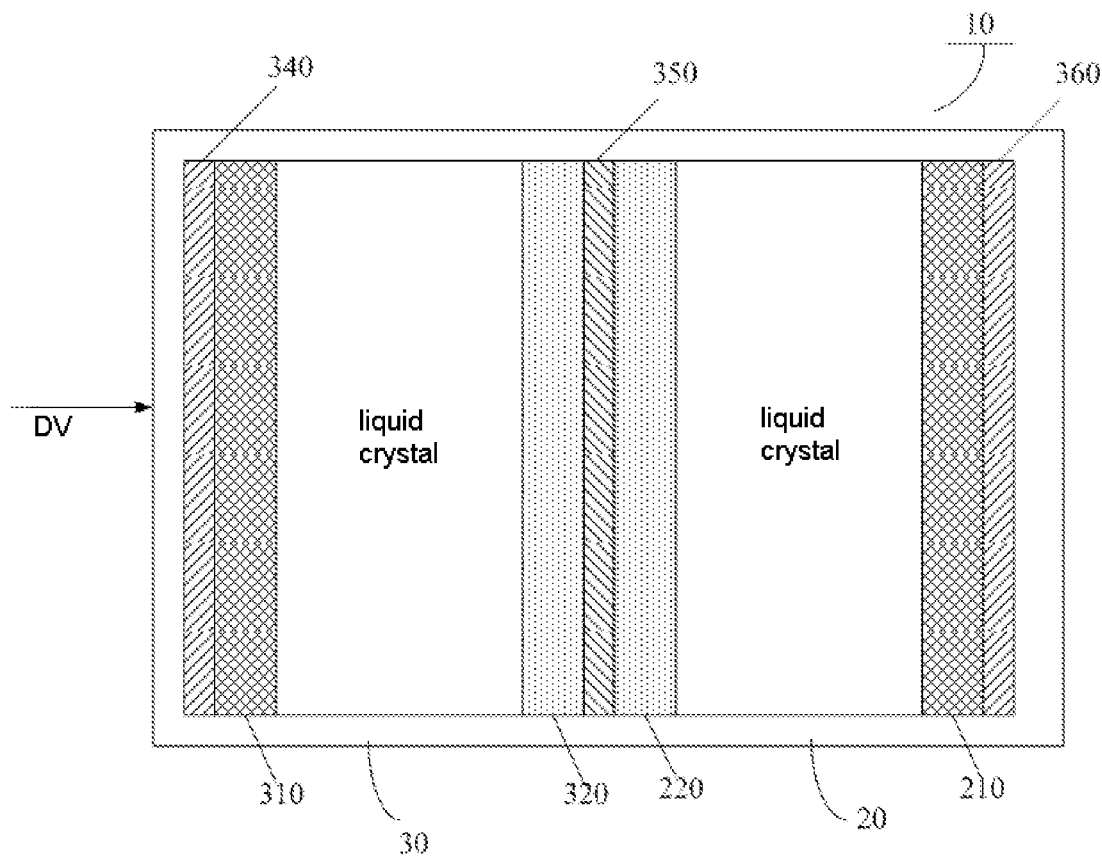
FIG. 3 is a schematic drawing of a display panel according to the second embodiment of the present invention.

In a display panel 10 according to a second exemplary embodiment of the invention, as shown in FIG. 3, a polarizer 350 is positioned between the display substrate 30 and the switch cell 20. In this case, the display substrate 30 and the switch cell 20 may use the same polarizer 350 without providing an individual polarizer respectively for the display substrate 30 and the switch cell 20, such that the number the polarizer used in the switch cell may be reduced from 4 to 3. In one example, a polarizer 340 is positioned on the side of the display substrate 30 away from the switch cell 20, and a polarizer 360 is positioned on the side of the switch cell 20 away from the display substrate 30. In the embodiment of the invention, because the display substrate 30 for displaying 2D or 3D images and the switch cell 20 is adjacently positioned facing with each other, sharing the polarizer 350 positioned between the substrate 30 and the switch cell 20 can be cost saving. Furthermore, as shown in FIG. 3, as the switch cell 20 is positioned behind the display substrate 30 in the direction of view, the Moire generated by the switch cell 20 can be decreased by the polarizer 350. Therefore, the Moire may be decreased by the polarizer 350 in the display substrate 30 without any additional component, such that the cost can be reduced, and the display quality can be promoted.

Figure 4:
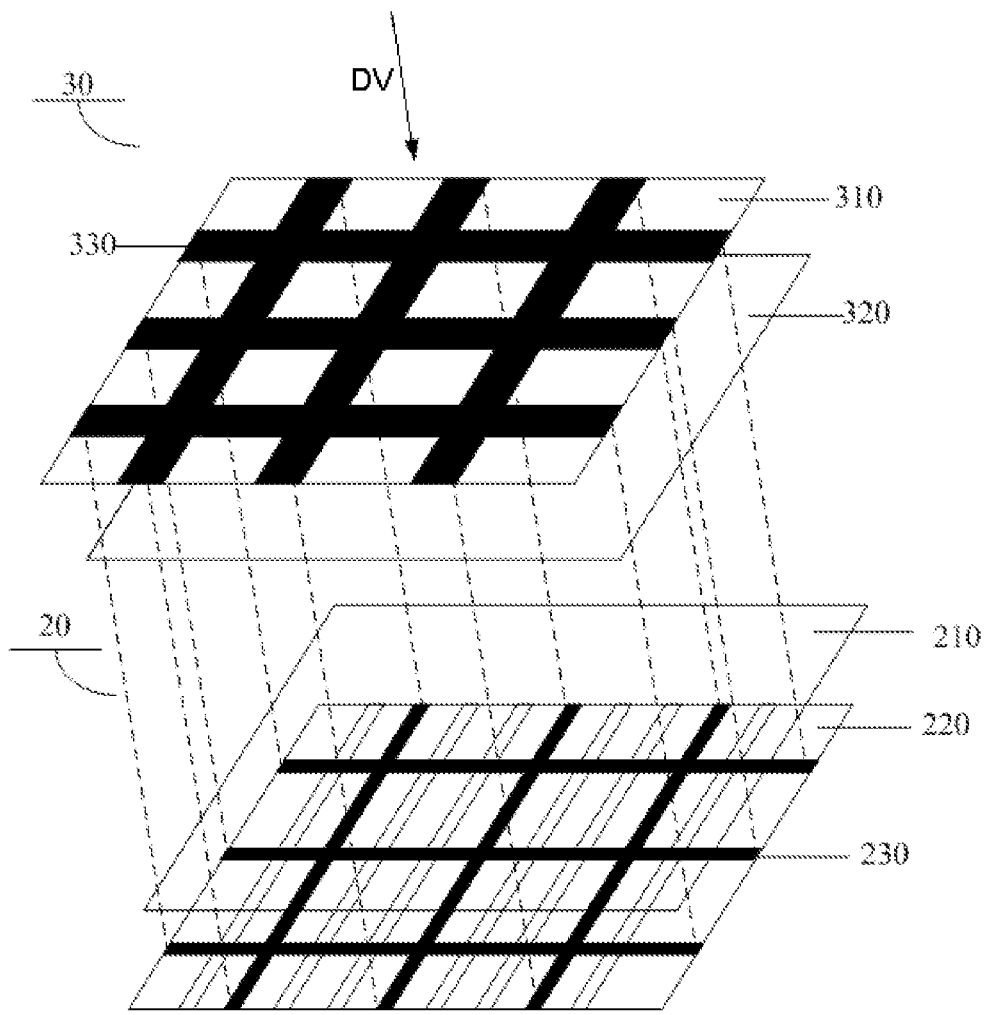
FIG. 4 is a schematic drawing of a display panel according to the third embodiment of the present invention.

In the third embodiment of the invention, as shown in FIG. 4, the switch cell 20 comprises a common electrode substrate 210 and a switch substrate 220. The display substrate 30 comprises a color film substrate 310 and an array substrate 320. Metal electrodes 230 are positioned on the switch substrate 220 transversely and longitudinally. Correspondingly, in the display substrate 30, the black matrixes 330 are positioned on the color film substrate 310 transversely and longitudinally, such that the projection regions of the metal electrodes 230 do not fall outside the orthogonal projection region of the black matrixes 230. The metal electrodes 230 configured transversely and longitudinally on the switch cell 20 can further increase the size and number of the metal electrodes in the switch cell, and further reduce the total resistance of the switch cell. Therefore, the driving power required by the display panel is decreased, and the switch cell is especially suitable for large sized display panel.

In a further embodiment of the invention, a display panel 10 is provided. As shown in FIGS. 1 and 2 the display panel 10 comprises the switch cell 20 mentioned in any one of the above embodiments and the display substrate 30, wherein the display substrate is provided with a plurality of black matrixes.

In the display panel 10 according to the embodiment of the invention, at least one metal electrode 201 is provided on the switch cell 20, and the at least one metal electrode 201 is shielded by the black matrix 301 through positioning of the metal electrode 201 correspond to at least a portion of the region occupied by one black matrix 301 of the at least one black matrix on the display substrate 30, such that total resistance of the switch cell is significantly reduced without affecting the aperture ratio of the display panel. Further, driving power required by the display panel is decreased, and the switch cell is especially suitable for large sized display panel.

In one embodiment of the invention, as shown in FIGS. 2 and 3, the switch cell 20 is positioned behind the display substrate 30. With the configuration above, the distance between the switch cell 20 and the display substrate 30 is configured relative larger than other configurations, such that the operations during the manufacturing of the liquid crystal panel are facilitated.

In another embodiment of the invention, as shown in FIGS. 2 and 4, the metal electrode 201 is positioned on the side of the switch cell 20 away from the display substrate 30.

According to a further embodiment of the present invention, there is provided a display device comprising the switch panel mentioned in the preceding embodiments. It can be appreciated by those skilled in the art that the display device may be provided with other components if necessary, which is not limited herein.

In the display device according to the embodiment of the invention, a black matrix shields at least one metal electrode at a certain extent by positioning every metal electrode of the switch cell in alignment with at least a portion of the black matrix in the direction of view, such that total resistance of the switch cell is significantly reduced without affecting the aperture ratio of the display panel. Further, driving power required by the display panel is decreased, such that the switch cell is especially suitable for large sized display panel.

According to a further embodiment of the present invention, there is provided a method of manufacturing a switch cell for converting a 2D image into a 3D image, the image transmitted from the switch cell is displayed on a display substrate, and the method comprises step of:

forming at least one metal electrode on a switch substrate, wherein the position of the metal electrode is configured to be correspond to at least a portion of one black matrix of at least one black matrix provided on the display substrate.

In an exemplary embodiment, the switch substrate may comprise a glass substrate or a resin substrate, etc., which is not limited herein. The step of forming at least one metal electrode on the switch substrate may comprise a process of cleaning and drying the switch substrate. Then the at least one metal electrode may be formed by depositing on the switch through a patterning process, such that the metal electrode is configured to be correspond to at least a portion of the region occupied by a corresponding black matrix. Therefore, the metal electrode is shielded by the corresponding black matrix at a certain extent.

In another exemplary embodiment, the method of manufacturing the switch cell may also comprise a step of forming a transparent electrode ITO. For example, through a patterning process, the transparent electrode ITO can be made by depositing at positions where metal electrodes are not formed. Although the embodiment of the method disclosed herein comprises the step of forming the transparent electrode ITO, but the invention is not limit thereto, a switch cell 20 without transparent electrodes ITO may also be appreciated by those skilled in the art.

In the method of manufacturing the switch cell according to the embodiment of the present invention, at least one metal electrode is formed on a switch substrate, such that the at least one metal electrode are shielded by the black matrixes at a certain extent by positioning every metal electrode in the switch cell in alignment with at least a portion of the corresponding black matrix in the direction of view, therefore total resistance of the switch cell is significantly reduced without affecting the aperture ratio of the display panel. Further, driving power required by the display panel is decreased, such that the switch cell is especially suitable for large sized display panel.

Further, in the step of forming the at least one metal electrode on the switch substrate, the position of the metal electrode corresponds to at least a portion of a corresponding black matrix on the display substrate. Specifically, in the direction of view, the projection of the metal electrode onto the display substrate does not fall outside the region occupied by the corresponding black matrix, and the angle between the direction of view and the plane of the display substrate is set within the range of 80-90 degrees.

According to an embodiment of the invention, the projection of the metal electrode onto the display substrate in the direction of view does not go beyond the region occupied by the black matrix on the display substrate, such that the metal electrode is ensured to be totally shielded by the black matrix, and the well effect of watching is ensured. When the angle between the direction of view and the plane of the display substrate is set within the range of 80-90 degrees, a suitable visual angle can be provided and the size and number of the metal electrodes in the switch cell is ensured, such that total resistance of the switch cell can be further reduced, the driving power required by the display panel is decreased, and the switch cell is especially suitable for large sized display panel.

In an embodiment of the present application, the switch cell is constructed with one substrate while other components facing the substrate can be used as the other substrate. In an alternative embodiment, the switch cell may be constructed with two substrates facing with each other.

Further, in the step of forming at least one metal electrode on a switch substrate, the position of the metal electrode corresponds to at least a portion of the region occupied by the black matrix on the display substrate. Specifically, the orthogonal projection region of the metal electrode on the display substrate is overlapped with the region occupied by the black matrix. As the orthogonal projection region of the metal electrode is configured to be overlapped with the region occupied by the black matrix on the display substrate, the size of the metal electrode may be maximized to reduce total resistance of the switch cell as much as possible, therefore the driving power required by the display panel is decreased, and the switch cell is especially suitable for large sized display panel.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A switch cell for converting a 2D image to be displayed by a display substrate into a 3D image, the switch cell comprises:
    a switch substrate;
    a plurality of transparent electrodes provided on the switch substrate; and
    at least one metal electrode provided on the switch substrate, wherein the at least one metal electrode and the transparent electrodes are in the same layer,
    wherein the transparent electrodes and the at least one metal electrode are electrically connected in parallel, and the position of each metal electrode is configured to correspond to at least a portion of one corresponding black matrix of at least one black matrix provided on the display substrate.

2. The switch cell according to claim 1, wherein, the projection region of the metal electrode on the display substrate does not fall outside the region occupied by the corresponding black matrix on the display substrate in the direction of view, and the angle between the direction of view and the plane of the display substrate is set within a range of 80 to 90 degrees.

3. The switch cell according to claim 1, wherein the orthogonal projection region of the metal electrode on the display substrate is overlapped with the region occupied by the corresponding black matrix on the display substrate.

4. The switch cell according to claim 1, further comprises a common electrode substrate positioned between the display substrate and the switch substrate.

5. A display panel, comprising:
the switch cell according to claim 1; and
the display substrate provided with a plurality of black matrixes.

6. The display panel according to claim 5, wherein, the projection region of the metal electrode on the display substrate does not fall outside the region occupied by the corresponding black matrix on the display substrate in the direction of view, and the angle between the direction of view and the plane of the display substrate is set within a range of 80 to 90 degrees.

7. The display panel according to claim 5, wherein the orthogonal projection region of the metal electrode on the display substrate is overlapped with the region occupied by the corresponding black matrix on the display substrate.

8. The display panel according to claim 5, further comprises a common electrode substrate positioned between the display substrate and the switch substrate.

9. The display panel according to claim 5, wherein, the switch substrate is positioned behind the display substrate in the direction of view.

10. The display panel according to claim 5, wherein the metal electrodes are positioned on a side of the switch substrate away from the display substrate.

11. A display device, comprising the display panel according to claim 5.

12. The display device according to claim 11, wherein, the projection region of the metal electrode on the display substrate does not fall outside the region occupied by the corresponding black matrix on the display substrate in the direction of view, and the angle between the direction of view and the plane of the display substrate is set within a range of 80 to 90 degrees.

13. The display device according to claim 11, wherein the orthogonal projection region of the metal electrode on the display substrate is overlapped with the region occupied by the corresponding black matrix on the display substrate.

14. The display device according to claim 11, further comprises a common electrode substrate positioned between the display substrate and the switch substrate.

15. The display device according to claim 11, wherein the switch substrate is positioned behind the display substrate in the direction of view.

16. The display device according to claim 11, wherein the metal electrodes are positioned on a side of the switch substrate away from the display substrate.

17. A method of manufacturing a switch cell for converting a 2D image to be displayed by a display substrate into a 3D image, the method comprising:
forming at least one metal electrode and a plurality of transparent electrodes electrically connected with the at least one metal electrode in parallel on the switch substrate, wherein the at least one metal electrode and the transparent electrodes are in the same layer, and wherein the position of the metal electrode is configured to correspond to at least a portion of one corresponding black matrix of at least one black matrix provided on the display substrate.

18. The method according to claim 17, wherein, the projection region of the metal electrode on the display substrate does not fall outside the region occupied by the corresponding black matrix on the display substrate in the direction of view, and the angle between the direction of view and the plane of the display substrate is set within a range of 80 to 90 degrees.

19. The method according to claim 17, wherein the orthogonal projection region of the metal electrode on the display substrate is overlapped with the region occupied by the corresponding black matrix on the display substrate.

* * * * *